United States Patent [19]

Steilen

[11] Patent Number: 4,715,515
[45] Date of Patent: Dec. 29, 1987

[54] HOPPER AND METERING MECHANISM STRUCTURE FOR AN AGRICULTURAL IMPLEMENT

[75] Inventor: Ronald M. Steilen, Ankeny, Iowa
[73] Assignee: Deere & Company, Moline, Ill.
[21] Appl. No.: 884,148
[22] Filed: Jul. 10, 1986
[51] Int. Cl.[4] ............................................. B67D 5/60
[52] U.S. Cl. ..................................... 222/143; 111/77; 222/609
[58] Field of Search ............... 222/143, 129, 173, 460, 222/608-610, 613-616, 623-625, 462; 111/73, 77, 80, 85, 34, 52; 206/503, 504; 220/1 B, 1 V, 5 A, 23.2, 72, 855; 296/182, 3; 215/6; 105/247, 248, 254, 406.1

[56] References Cited

U.S. PATENT DOCUMENTS

| | | | |
|---|---|---|---|
| 2,680,539 | 6/1954 | Seltzer | 222/616 |
| 2,797,847 | 7/1957 | Barber et al. | 222/609 |
| 2,801,030 | 7/1957 | Beck | 222/609 |
| 2,968,264 | 1/1961 | Schnell | 222/608 |
| 3,228,363 | 1/1966 | Gardner et al. | 111/73 |
| 3,425,599 | 2/1969 | Sammarco et al. | 222/609 |
| 4,138,163 | 2/1979 | Calvert et al. | 222/610 X |
| 4,541,549 | 9/1985 | Hadley et al. | 222/143 |
| 4,561,222 | 12/1985 | Fons | 220/1 B X |

Primary Examiner—Joseph J. Rolla
Assistant Examiner—Kevin P. Shaver

[57] ABSTRACT

Hopper and meter support structure for easy removal of hopper and metering mechanisms to facilitate converting a complete grain drill or similar implement from one row spacing to another. A molded plastic hopper rests on transversely extending beam members of the grain drill main frame and includes lower flanges supported on two lower tubular beam members. The metering mechanism includes flanges which are sandwiched between the tubular beams and the hopper flanges, and these components are held in position by angles which are removeably attached to the lower beams. By simply removing the angles, the entire hopper and meter support structure may be lifted from the beam members.

14 Claims, 5 Drawing Figures

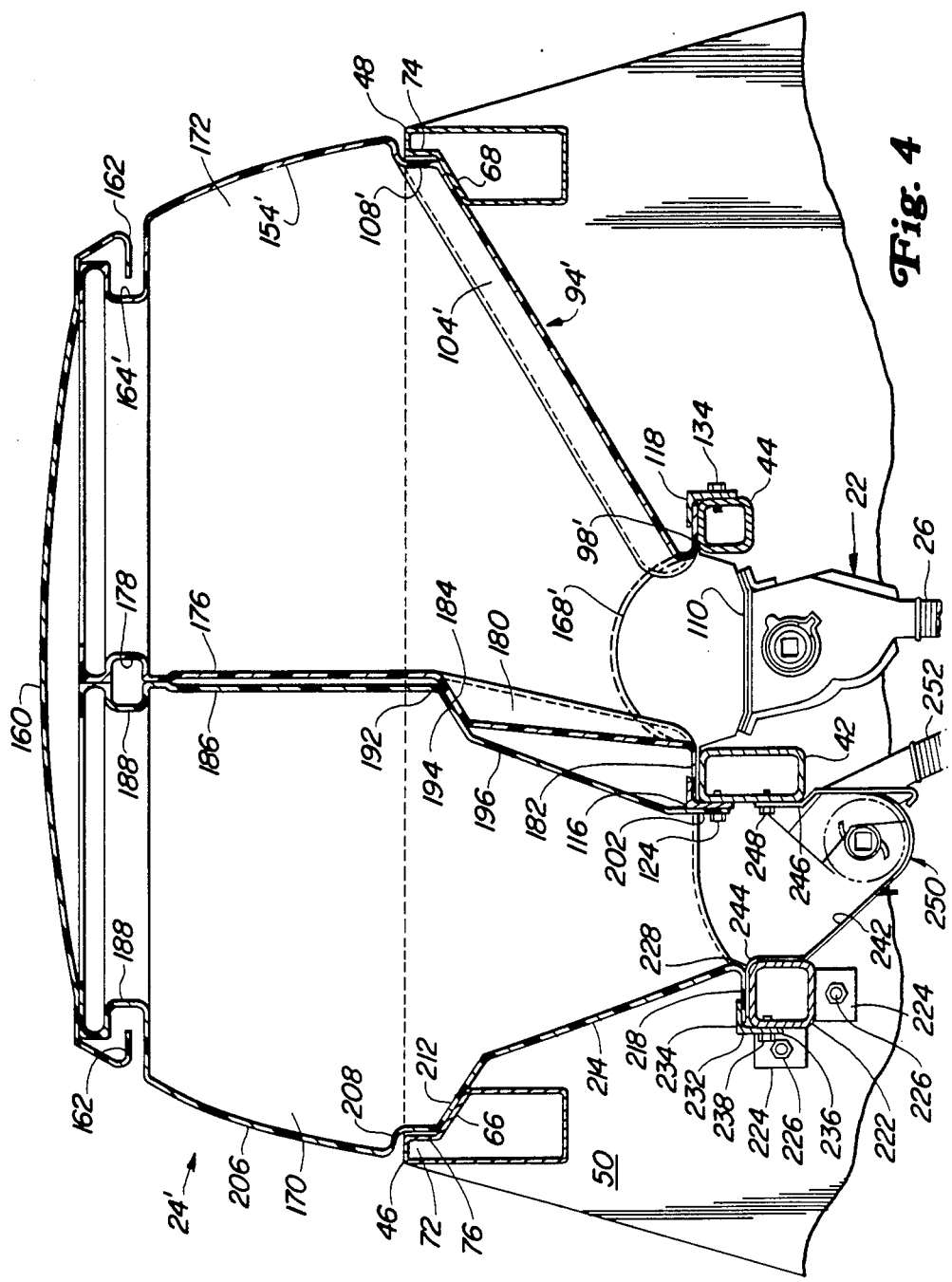

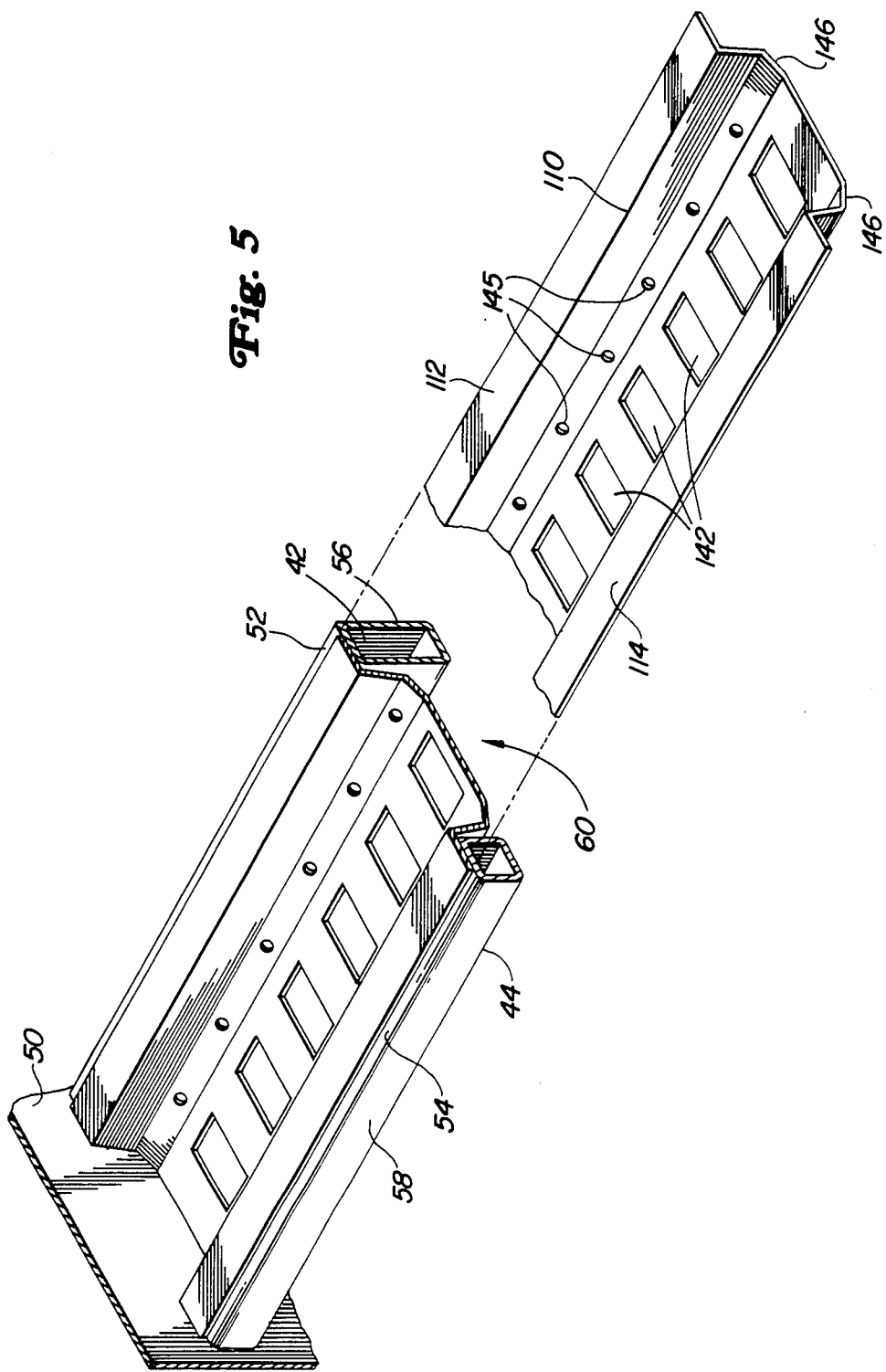

HOPPER AND METERING MECHANISM STRUCTURE FOR AN AGRICULTURAL IMPLEMENT

BACKGROUND OF THE INVENTION

The present invention relates generally to agricultural implements, and more specifically to seeding implements such as grain drills or the like which include a grain or fertilizer box and a metering structure for metering material from the box for deposit in the soil.

On many current seeding machines, such as the John Deere Series 8000 Grain Drills, the grain box and grain metering structure form an assembly which is held together by numerous bolts and becomes a major part of the machine main frame. At times it becomes necessary to remove the grain tank components or the metering mechanism for such things as maintenance and repair and for changing row spacings. Because of the numerous components and large number of bolts involved in the assembling and disassembling of the unit, such operations become very time-consuming and difficult. For example, when it becomes necessary to remove a meter insert panel to change row spacings, a series of bolts connected between front and rear flange on the panel and connected to front and rear grain box sheets must be removed. Thereafter the panel is removed from the grain drill and a new panel is inserted. The bolts have to be reconnected between the flanges and the grain box sheets. Rather than changing a panel, the owner may retain a given row spacing even through he feels a different spacing may be more advantageous. Since the grain tank is a main component of the mainframe, removing or replacing the tank becomes very difficult. The metal tanks are also subject to corrosion, particularly when a fertilizer tank is utilized, and replacement of corroded tank components is further hindered by corroded fasteners and the like.

OBJECTS OF THE INVENTION

It is therefore an object of the present invention to provide an improved grain box and metering mechanism system for a grain drill or the like. It is a further object to provide such a system which facilitates easy removal of tank and metering mechanisms.

It is yet another object of the present invention to provide an improved tank and mounting arrangement for an agricultural implement. It is a further object to provide such an arrangement with a plastic tank wherein study support is provided with a minimal of fasteners or other connecting hardware.

It is yet a further object of the present invention to provide an improved tank arrangement for a grain drill or similar implement wherein a single tank or a pair of nestled tanks may be selective attached to the framework of the drill with a minimal number of attaching points. It is a further object to provide such an arrangement wherein a pair of plastic tanks are utilized and one of the plastic tanks gains vertical support from the adjacent plastic tank. It is still another object to provide such an arrangement with an improved mounting structure located at the lower end of the tanks.

BRIEF DESCRIPTION OF THE INVENTION

In accordance with the above objects, flexible, transversely extending hopper structure is supported on transversely extending beam structure forming a portion of the main frame of a grain drill or similar implement. The tank structure includes reinforced inclined lower wall sections which terminate in outwardly directed flanges which rest on top of a pair of fore-and-aft spaced tubular beams. A meter support panel is cradled between the beams and includes outwardly turned flanges which are sandwiched between the tank flanges and the top of the beams. Angles are bolted to the faces of the beams and include horizontal portions bearing against the top of the hopper flanges to secure the hopper and the meter support panel in position on the frame. Additional transversely extending beam structure supports the central portion of the flexible hoppers near the upper end of the inclined lower wall section for additional support without fixed connectors. The meter support panel is slotted to receive a plurality of meters which are bolted to the bottom of the panel. To remove the hopper and/or meter structure, the bolts are simply removed from the angles and the hopper is lifted from the supportive beams. The meter support panel may then be lifted out and replaced with a support panel having a different slot arrangement so that row spacing may be easily changed when necessary.

In a second embodiment, two flexible tanks are supported with similar flange mounting structures. The second tank can hold material such as fertilizer while the first tank contains grain. The first tank includes a generally upright sidewall adjacent the second tank which is reinforced and which includes an offset portion defining inclined ledge structure on which one side of the second tank rests for support. The side of the second hopper includes a lower inward wall extending downwardly from the offset portion to a vertical flange which is slotted and which simply slides over the bolt which holds the angle mounting the first tank to the central transversely extending beam structure. A third transversely extending beam supports the lower outermost wall of the second tank in a manner similar to the support arrangement for the flanges of the first tank. The same transversely extending beam structure may be utilized for the main frame of the implement regardless of whether one or two flexible hoppers are utilized thereby reducing the number of components necessary to provide the second tank option. Ribbing on the lower walls of the flexible tank provide sturdy lower support between the first and second sets of transversely extending beam structure. The structure provides easy removal of the hopper and metering mechanisms which in turn facilitates converting a complete machine from one row spacing to another by simply removing one meter panel and installing another with the desired row spacing.

These and other objects, features and advantages of the present invention will become apparent to one skilled in the art upon reading the following detailed description in view of the drawings.

BRIEF DESCRIPTION OF THE DRAWINGS

FIG. 4 is a view similar to FIG. 3 but showing an alternate embodiment wherein two flexible tanks are supported side-by-side for containing two different granular materials.

FIG. 5 is a perspective view, partially broken away, of the meter support panel structure utilized with the grain drill hopper of FIGS. 3 & 4 with the meters removed.

DESCRIPTION OF THE PREFERRED EMBODIMENT

Figure 1:
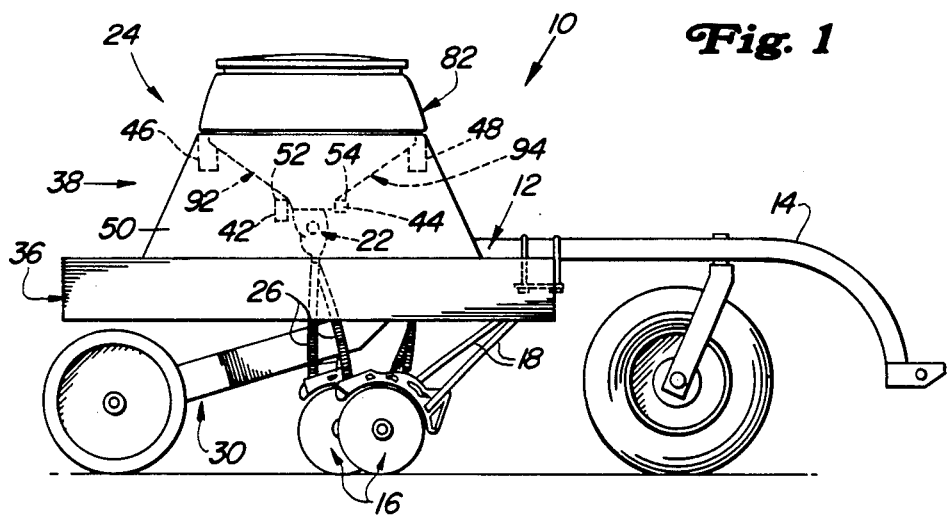
FIG. 1 is a side view of a grain drill constructed in accordance with the teachings of the present invention.
Figure 2:
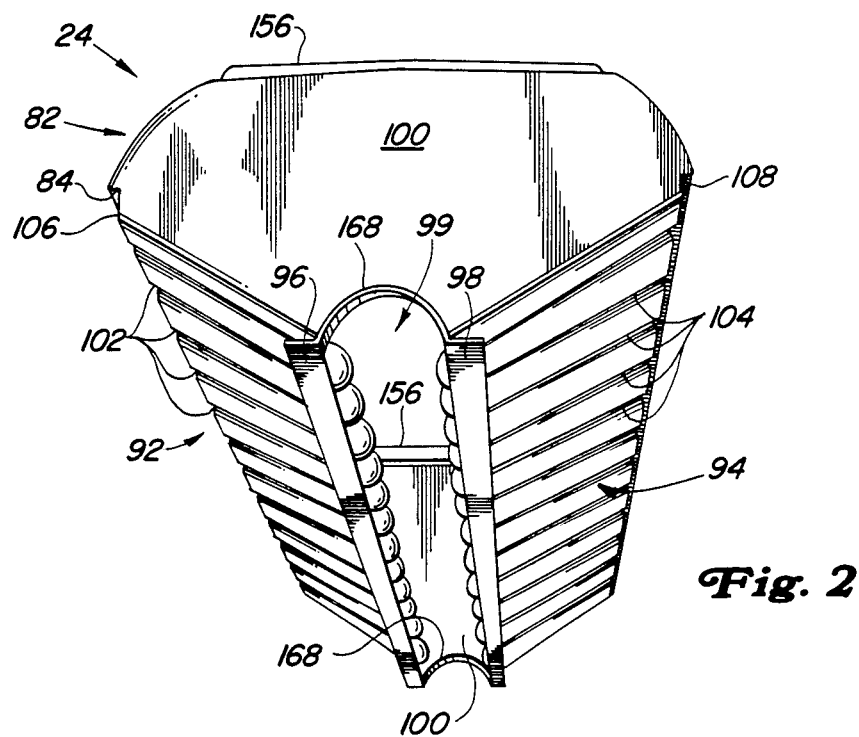
FIG. 2 is a bottom perspective view of the flexible hopper utilized with the grain drill of FIG. 1.

Referring now to FIG. 1, there is shown a grain drill 10 having a main frame 12 adapted for towing by hitch structure 14 forwardly over a field where seed and/or fertilizer is to be deposited. A plurality of opener assemblies 16 are connected by drawbar structure 18 to the main frame 12 for opening furrows in the soil to deposit seed and/or fertilizer therein. Seed meters 22 are transversely spaced along the frame 12 below flexible plastic tank or hopper structure 24 to meter granular material from the hopper structure through seed tubes 26 to the opener assembly 16. Press wheel assemblies 30 are mounted on the main frame 12 behind the opener assemblies 16 for firming the soil over the deposited material.

The main frame 12 includes lower and upper frame structure 36 and 38, respectively. The upper frame structure 38 includes a plurality of tansversely extending beam members 42, 44, 46 and 48. The beams 42-48 extend substantially the entire transverse distance of the main frame 12 and are connected at their outermost ends to a pair of end panels 50 supported by and extending upwardly from the lower frame structure 36. The beams 42-48 are supported parallel to each other with the lower beams 42 and 44 having upper beam surfaces 52 and 54, respectively, lying substantially in the same horizontal plane. The beam 42 includes a vertical, rearwardly facing surface 56, and the beam 44 includes a vertical, forwardly facing surface 58. The beams 42 and 44 are spaced fore-and-aft near the lower portion of the upper frame structure 38 to define a transversely extending open area 60 therebetween.

Figure 3:
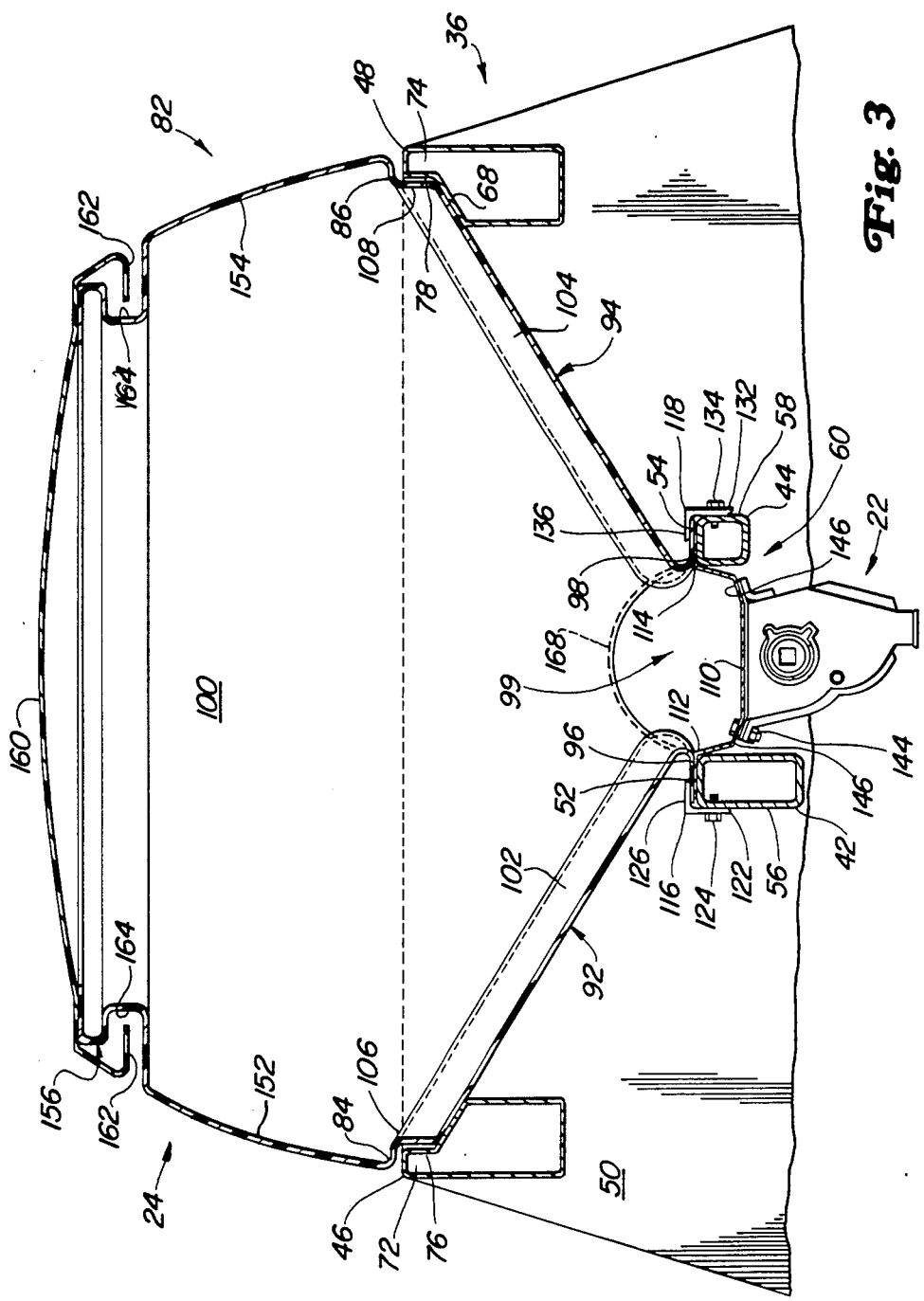
FIG. 3 is an enlarged side view partially in section showing the structure of the flexible hopper and the meter support panel with meters attached thereto.

The beam 46 is supported rearwardly of and above the beam 42, and the beam 48 is supported forwardly of and above the beam 44. The beams 46 and 48, which are substantially mere images of each other, are tubular and include inwardly and downwardly extending support structures or surfaces 66 and 68, respectively. Below the support surfaces 66 and 68, the beams 46 and 48 are generally rectangular in cross section (FIG. 3). Narrow projections 72 and 74 extend upwardly from the support surfaces 66 and 68 and include short inwardly directed vertical walls 76 and 78, respectively, to help stabilize and confine the flexible tank 24 which freely rests on the surfaces 66 and 68.

The tank or hopper structure 24 includes an upper, generally dome-shaped portion 82, rear and front intermediate portions 84 and 86 connected to inwardly and downwardly inclined lower walls 92 and 94, respectively. Horizontal flanges 96 and 98 extending substantially the entire width of the hopper structure 24 project rearwardly and forwardly from the lower inclined walls 92 and 94, respectively, and define a downwardly opening area 99. End walls 100 close the outermost ends of the hopper structure 24.

The lower walls 92 and 94 are deeply ribbed at locations 102 and 104, respectively, to provide reinforcement to the lower portion of the hopper structure 24 and provide a sturdy bridge between the beam pairs 42, 46 and 44, 48.

The hopper structure 24 is assembled onto the upper frame structure 36 with the horizontal flanges 96 and 98 resting on the corresponding top surfaces 52 and 54 of the beams 42 and 44. The upper ends of the ribbed walls 92 and 94 rest on the support structures 66 and 68 of the beams 46 and 48. The upper termination of the ribs 102 and 104 define short vertical wall sectons in the intermediate portions 84 and 86, respectively. These wall sections are located inwardly adjacent the vertical walls 76 and 78 of the narrow projections 72 and 74 on the beams 46 and 48.

An upwardly opening, U-shaped meter support panel 110 is cradled in the open area 60 between the beams 42 and 44 and includes rearwardly and forwardly directed panel flanges 112 and 114 which rest on the top surfaces 52 and 54 of the beams 42 and 44. The flanges 112 and 114 are sandwiched between the flanges 96 and 98 and the corresponding top surfaces 52 and 54. To firmly secure the panel 110 and the bottom of the hopper structure 24, angles 116 and 118 are connected to the beams 42 and 44 and bear against the flanges 96 and 98. The angle 116 includes an upright flange 122 connected by a plurality of transversely spaced self-tapping screws 124 to the upper portion of the vertical surface 56. A forwardly extending horizontal flange 126 bears against the top surface of the flange 96. The angle 118 includes an upright flange 132 connected by self-tapping screws 134 to the upper portion of the vertical surface 58 of the beam 44. The angle 118 includes a horizontal rearwardly extending flange 136 which bears against the top surface of the flange 98.

The support panel 110 includes a plurality of transversely spaced slots 142 (FIG. 5) adapted for opening into the upper ends of the seed meters 22 which are attached to the lower portion of the panel 110 by bolts 144 which extent through the meters and through holes 145 in angled corner sections 146 of the panels 110.

The inclined lower walls 92 and 94 completely bridge the area between the beams 42, 44, 46 and 48. The upper dome-shaped portion 82 includes side walls 152 and 154 extending upwardly and slightly inwardly from the top portion of the lower walls 92 and 94. The dome-shaped portion 82 terminates in a lid receiving portion 156 opening upwardly to receive granular material therethrough. The lid receiving portin 156 defines a rectangular opening extending substantially the length of the tank 24 and having a generally S-shaped cross section for strength and for receiving a mating lid 160. The lid 160 has inwardly directed lips 162 which enter the channel area indicated generally at 164 defined by the lower portion of the cross section of the lip receiving portion 56. The lower portions of the hopper end walls 100 include arcuate rimmed portions extending between the flanges 96 and 98 and adapted to rest on corresponding structure on the end panels 50.

In the alternate embodiment of FIG. 4, the hopper structure, indicated as 24', includes two hoppers 170 and 172 having a configuration the outermost boundaries of which conforms generally to the shape of the hopper structure 24 shown in FIG. 3 so that the dual hopper structure shown in FIG. 4 may be utilized with generally the same frame arrangement as shown in FIGS. 1 and 3. The portions of the hopper 172 which are substantially identical to the portions of the hopper of the embodiment shown in FIG. 3 are indicated by the same reference numerals with a' attached. The arrangement of these similar elements therefore will not be described in complete detail again. The tank 172, however, has approximately one-half the capacity of the hopper structure 24 shown in FIG. 3 and includes an inner upright wall 176 located above the meter structure 22. The upper portion of the wall 176 is generally planar except for a channel area 178 which defines the continuation fo the channel area 164'. The lower portion of the wall 176 is ribbed at 180 and extends downwardly to a rearwardly turned flange 182 which is secured between the flange 126 of the angle 116 over the panel flange 112 in the manner described for the embodiment of FIG. 3. The top of the ribbed portion 180 is angled upwardly int he forward direction to define a supporting portion 184 which extends rearwardly and downwardly in a transverse plane from the upright upper section of the inner wall 176.

The rear hopper 170 includes an inner wall 186, the upper portion of which is generally the mirror image of the adjacent inner wall 176 of the hopper 172 and includes a channel 188 which abuts against the channel 178. Below the channel 188, the wall 186 extends downwardly parallel to and offset slightly rearwardly of the wall 176. At location 192 the inner wall 186 angles rearwardly and downwardly to define a generally planar transverse angled surface 194 which rests on the supporting portion 184 of the ribbed lower portion 180 of wall 176. Adjacent the surface 194, the inner wall 186 includes a lower portion 196 which extends downwardly and slightly rearwardly terminating in a vertical slotted flange 202. The slots are spaced and dimensioned to ride over the shanks of the screws 124. After the flange 202 is positioned over the screws 124, the screws are tightened so that the screw heads secure the flange and thereby the lower portion of the inner wall 186 against the angle 116. A single set of screws 124 therefore secures the lower portions of the walls 176 and 186 as well as the meter support panel 110 in position on the central transversely extending beam 42.

The hopper 170 includes a rear sidewall 206 angling downwardly and rearwardly from the channel 188 to an intermediate portion 208 adapted to extend around the narrow projection 72 of the transverse beam 46. The downwardly and forwardly inclined section 212 connects to an upright rear wall section 214 which terminates at its lower end in an rearwardly directed flange 218.

To support the flange 218 and therefore the aft portion of the hopper 170, a fifth transversely extending beam member 222 is connected between the end panels 50 by brackets 224 and bolts 226. The beam 224 is located rearwardly adjacent the beam 42 and includes a top face 228 which extends parallel to but slightly below the level of the top face of the beam 42. The flange 218 of the hopper 170 is fixed against the top surface 228 by an angle 232. The angle 232 includes a top flange 234 which bears against the hopper flange 218, and an upright flange 236 which is connected by self-tapping screws 238 to the aft face of the beam 222 to thereby tightly secure the top flange 234 against the flange 218. A transversely extending meter panel 242 includes a rear flange 244 which is sandwiched between the flange 218 and the top surface 228. The panel extends downwardly and forwardly from the beam 222 to an upwardly extending portion 246 which bears against the aft face of the beam 42 and is connected thereto by transversely spaced screws 248. A plurality of fertilizer meters 250 are transversely spaced along the panel 246 to delivery granular material from the hopper 170 through hoses 252 to the ground.

In the preferrred embodiment, the upper portion of the hoppers 170 and 172 assumes a configuration generally identical to the hopper structure 24 shown in FIG. 3, and the same lid 160 may be utilized to cover the upwardly portions of the hoppers 170 and 172. The lip 162 of the lid 160 enters the channel areas 164' and 188 to prevent the lid from blowing off and to direct moisture away from the top openings in the hoppers. Vertical support for the front wall of the rear hopper 170 is achieved primarily by means of the angled surface 194 resting on the supporting portion 184.

The hopper 170 may be easily removed by loosening or disconnecting the angle 232 and lifting the hopper 170 so that the vertical slotted flange 202 slides out around the shank of the screws 124. The fertilizer meter structure 250 may then be removed by removing the screws 248 which secure the forward face of the panel 246 to the aft face of the transverse beam 42. The hopper 172 and meter structure 22 may be removed in the manner similar to that described for the embodiment of FIG. 3. The innermost portions of the hoppers 170 and 172 bear against each other at the channel locations 178 and 188 and also at the angled portions 184 and 194 to provide fore-and-aft stability to the tank support arrangement.

Having described the preferred embodiment, it will be apparent that modifications can be made without departing from the scope of the invention as defined in the accompanying claims.

I claim:

1. Hopper structure for a seeding and/or fertilizing implement having a frame, said hopper structure comprising:
   first and second support surfaces extending parallel and spaced with respect to each other to define an elongated opening therebetween;
   meter support structure having outwardly directed support flanges for support on the respective support surfaces;
   a flexible tank having lower sidewalls terminating in lower, outwardly extending tank flanges; and
   means releasably sandwiching the outwardly directed support flanges between the outwardly extending tank flanges and the support surfaces, said means releasably sandwiching including an elongated flat portion and means securing the flat portion against the generally parallel to one of the tank flanges independently of fasteners passing through said one of the flanges and the corresponding support flange.

2. The invention as set forth in claim 1 wherein the means releasably connecting comprises an angle.

3. The invention as set forth in claim 1 wherein the meter support structure comprises an elongated panel having a generally U-shaped configuration with upright sidelegs, said outwardly directed flanges connected to the upper ends of the side legs for cradling the support panel in the elongated opening between the first and second support surfaces.

4. The invention as set forth in claim 1 wherein the implement frame includes first and second elongated and parallel extending beams, and wherein said first and second support surfaces comprise the upper surfaces of the beams.

5. The invention as set forth in claim 4 wherein the first and second beams include upright surfaces extending downwardly from the upper surfaces; and wherein the means releasably connecting comprises an angle having a top flange defining the elongated flat portion, and an upright flange, and the means securing the flat portion against the tank flange includes fastener means securing the upright flange to the upright beam surface for urging the top flange of the angle against the tank flange.

6. The invention as set forth in claim 4 further comprising third and fourth elongated beams located above and outwardly of the first and second beams, and wherein the lower sidewalls include upper portions freely resting on the respective third and fourth elongated beams.

7. The invention as set forth in claim 6 wherein the lower sidewalls comprise ribbed sections having lower ends connected to the outwardly extending tank flanges and an upper end resting on the third and fourth beams.

8. Hopper structure for a seeding and/or fertilizing implement having a frame, said hopper structure comprising:
   first and second support surfaces extending parallel and spaced with respect to each other to define an elongated opening therebetween;
   a flexible tank having lower sidewalls terminating in lower, outwardly extending tank flanges;
   means releasably connecting the outwardly extending tank flanges to the support surfaces; and
   wherein a one of the lower sidewalls is substantially vertical and includes a reinforced lower sidewall portion having an upwardly directed supporting portion; and a second tank having an inner sidewall with a downwardly directed surface supported on the upwardly directed supporting portion, and an outer sidewall supported by the implement frame, said inner and outer sidewalls of the second tank defining a second elongated opening, first and second metering structures, and means releasably securing the metering structure to the frame and support surfaces for support within the first and second elongated openings, respectively.

9. The invention as set forth in claim 8 including an outwardly directed flange connected to the lower end of the outer sidewall of the second tank, a beam fixed to the implement frame offset from and parallel to the first and second support surfaces and means for releasably clamping the outwardly directed flange of the outer sidewall to the beam.

10. The invention as set forth in claim 8 wherein the first metering structure includes a panel having panel flanges secured between the tank flange and the first and second support surfaces.

11. In a dispensing implement for towing forwardly over a field and for depositing granular material such as seed and/or fertilizer in the soil, comprising:
   beam structure including first and second fore-and-aft spaced transverse beams defining an open area therebetween;
   a third transverse beam located rearwardly and above the first beam;
   a fourth transverse beam located forwardly and above the second beam;
   a transversely extending flexible hopper having aft and forward walls supported on the third and fourth beams, respectively, and extending downwardly and inwardly therefrom to outwardly projecting flanges supported on the first and second beams;
   a transversely extending meter panel having outwardly directed panel flanges supported on the first and second beams in said open area; and
   removable clamp means supported adjacent to and releasably securing the projecting flanges and the panel flanges to the first and second beams independently of fasteners passing through said projecting flanges, said panel flanges being sandwiched between the first and second beams, and the projecting flanges by said clamp means, said clamp means when removed for permitting the flexible hopper to be lifted from the first and second beams for easy access to and removal of the meter panel.

12. The dispensing implement as set forth in claim 11 wherein the removable clamp means comprises an angle having a top angle flange projecting over one of the hopper flanges and an upright flange, and means for securing the upright flange to a side of the corresponding one of the first and second beams.

13. The dispensing implement as set forth in claim 11 wherein the forward and aft walls include ribbed lower portions bridging the areas between the first and third, and the second and fourth beams.

14. In a dispensing implement having a transversely extending lower main frame assembly for towing forwardly over a field and for depositing granular material in the soil, said dispensing implement comprising: upper frame structure including end panels connected to and extending upwardly from the lower main frame assembly, first and second transverse beams extending between the end panels and defining a transversely extending open area opening downwardly between said beams; third and fourth transverse beams supported above, and rearwardly and forwardly of respectively, the first and second beams; a transversely extending flexible tank having a lower flanged portion with a downwardly opening area defining a material discharge portion; a transversely extending meter support cradled between the first and second beams; means releasably supporting the lower flanged portion of the tank on the first and second beams with the discharge portion adjacent the transversely extending open area and over the meter support; and wherein said flexible tank includes transversely extending fore-and-aft spaced intermediate portions freely resting on the respective third and fourth beams and wherein the meter support freely rests on the first and second beams independently of fasteners passing through the meter support and the means releasably supporting includes means for sandwiching the meter support between said first and second beams and the lower flanged portion.

* * * * *